United States Patent [19]

Newton, Sr.

[11] Patent Number: 5,584,238
[45] Date of Patent: Dec. 17, 1996

[54] FAT/STOCK SEPARATOR

[76] Inventor: Robert J. Newton, Sr., 2109 Wayne Rd., Stuart, Fla. 34994

[21] Appl. No.: 628,953

[22] Filed: Apr. 8, 1996

[51] Int. Cl.⁶ .................................................. A47J 43/28
[52] U.S. Cl. .................. 99/495; 99/400; 99/446; 141/331; 141/343; 141/375; 210/181; 210/474; 210/514
[58] Field of Search ...................... 99/495, 496, 456–458, 99/444–446, 400, 450; 141/341, 344, 331, 375, 340, 343; 210/136, 181, 188, 512.1, 474, 249, 514, 517, 519, 470; D7/691, 668; 222/460, 564

[56] References Cited

U.S. PATENT DOCUMENTS

| | | | |
|---|---|---|---|
| 3,701,425 | 10/1972 | Laval, Jr. | 210/512.1 X |
| 3,730,344 | 5/1973 | Mason | 210/181 |
| 4,031,032 | 6/1977 | Jablecki | 141/344 X |
| 4,145,294 | 3/1979 | Wilbur | 210/474 X |
| 4,206,856 | 6/1980 | Lobel et al. | 222/564 |
| 4,361,590 | 11/1982 | Wojcik | 426/480 |
| 4,389,926 | 6/1983 | Joyner | 99/495 |
| 4,464,265 | 8/1984 | Joyner | 99/495 |
| 4,492,635 | 1/1985 | Stigebrandt | 210/519 |
| 4,640,185 | 2/1987 | Joyner | 99/444 |
| 4,934,420 | 6/1990 | Radna | 141/331 X |
| 5,297,476 | 3/1994 | Garland et al. | 99/495 |
| 5,526,737 | 6/1996 | Betzen | 99/495 |

*Primary Examiner*—Timothy F. Simone
*Attorney, Agent, or Firm*—Kevin Redmond

[57] ABSTRACT

A fat/stock separator comprising a colander, a transparent hopper vessel with a trap, a support base and a flow valve mounted to and connected through the wall of the hopper vessel to the trap for draining fluid from the hopper vessel. The colander in a preferred embodiment is sufficiently large to accept the stock and meat parts produced from cooking a large portion of meat or fowl, such as a complete turkey. The oil and fat contained within the stock separates and floats to the top after standing for a period of time. It is then possible to draw off through the flow valve fat free stock from beneath the layer of oil. The contours of the trap and the transparency of the hopper vessel facilitate determining accurately where the fat free stock ends, thereby making it possible to draw off fat free stock, whether there is a large or a small amount of liquid in the hopper vessel.

10 Claims, 2 Drawing Sheets

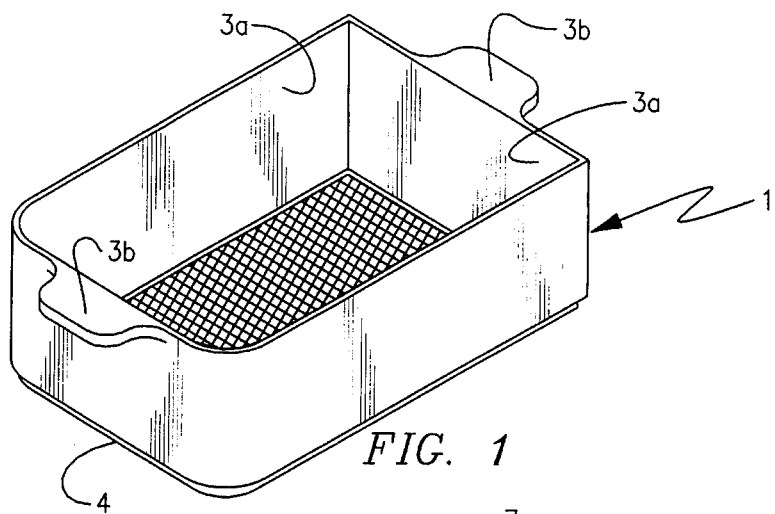
FIG. 1
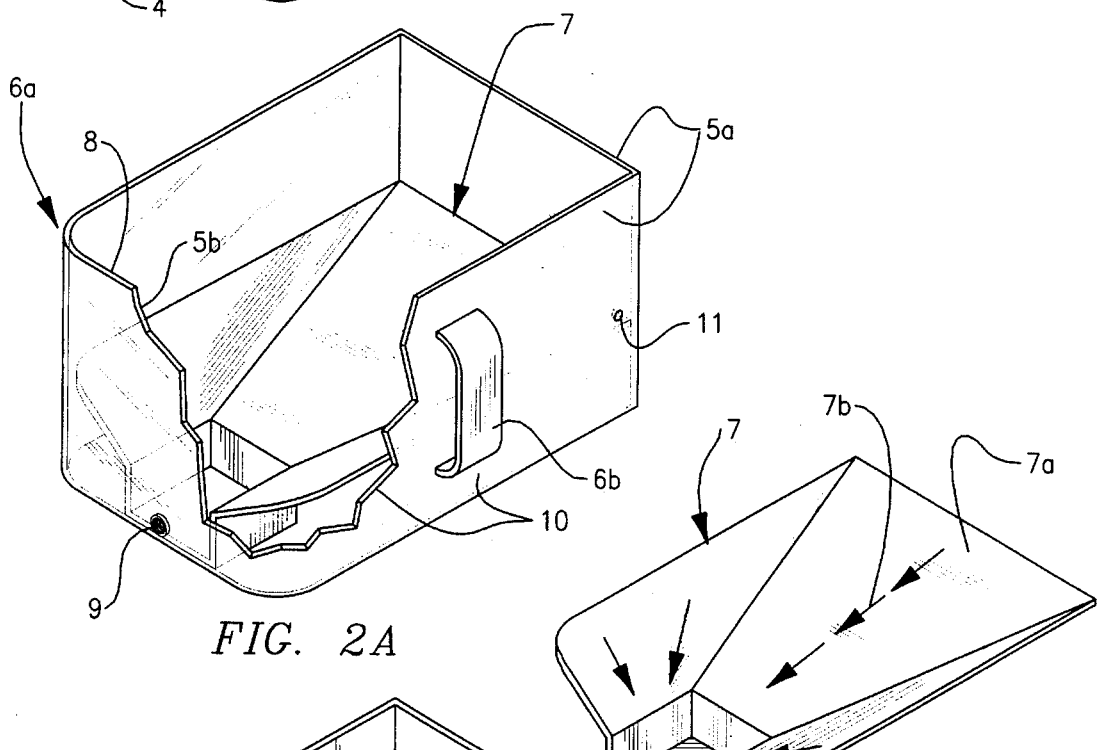
FIG. 2A
FIG. 2B
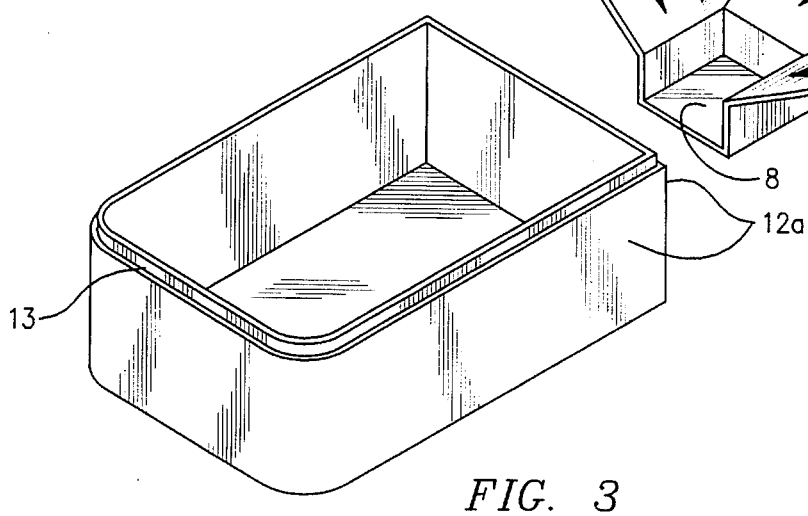
FIG. 3

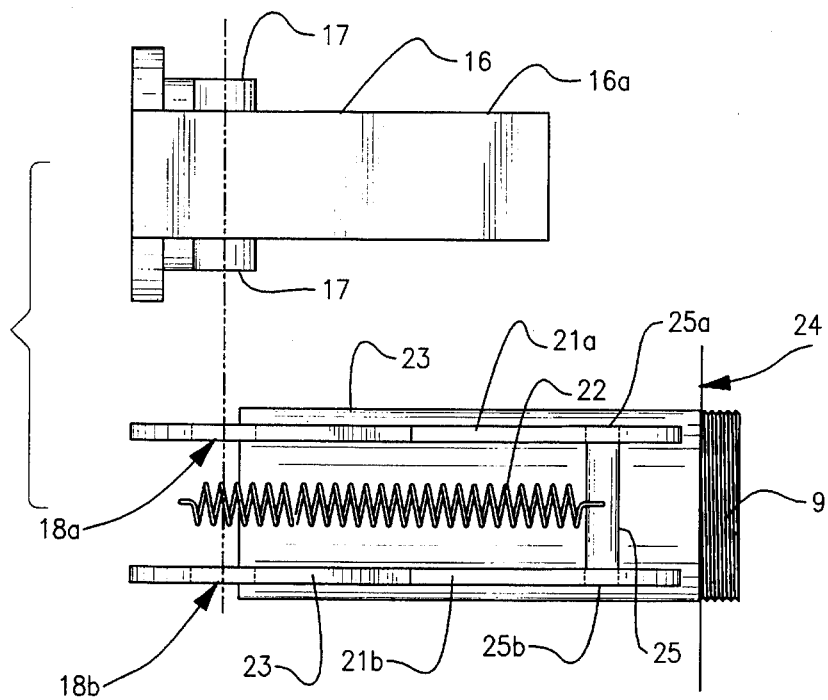
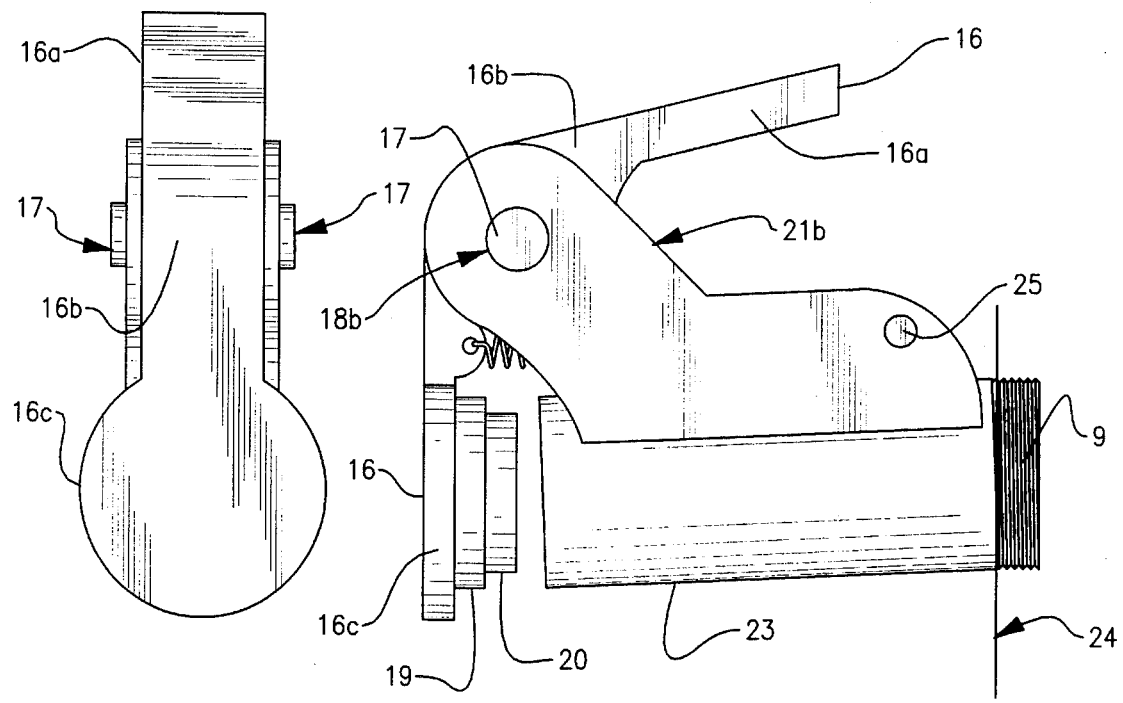
FIG. 4A
FIG. 4B
FIG. 4C

FAT/STOCK SEPARATOR

BACKGROUND OF THE INVENTION

1. Field of the Invention

The present invention relates to devices designed to separate clear stock from fats, oils, and meat solids derived from cooking meat or fowl.

2. Description of the Prior Art

Prior art separating systems generally do not use a screen filter to separate out small particles of meat from the stock. Where a screen filter is applied, it is often inconvenient to use. For example in U.S. Pat. No. 4,934,420 the screen is simply placed over the top of the collection vessel. The edge of the screen filter has nothing to prevent particles of meat from falling over the edge of the collection vessel and on to the counter below.

U.S. Pat. No. 5,297,476 also uses a screen filter with only a slight depression for holding the meat particles from pouring over the side. Although the depression is an improvement over the flat screen filter of U.S. Pat. No. 4,934,420 described above, it is not enough to assure that larger sections of meat will not fall over the sides when poured into the filter.

Another problem area found in prior an separators often involves the flow valve used to control the flow of liquid from the collection vessel. The valve is often difficult to operate and difficult to clean. For example, in U.S. Pat. No. 3,713,788 the control rod for the valve extends up through the stock and fat layer. The control rod is an extra component which must be cleaned because of its position in the stock and fat. Actuation of the control rod requires the operator's hand to be on top of the separator while the operators head must be to the side to see where the fat layer is located.

Yet another problem area with prior art separators is controlling the point at which the flow valve is shut off to prevent fat from being added to the clear stock as it is drained from the collection vessel. This is due to a funnel-like collection vessel used in many prior art devices such as those shown in U.S. Pat. Nos. 3,865,023, 4,331,189, 4,389, 926, 4,460,185, 4,464,265, 4,934,420, and 5,297,476. In these inventions, the rate at which the liquid drops in the collection vessel is relatively slow when the liquid is in the wide upper area of the collection vessel. However, as the fluid drops in the collection vessel, the rate at which it drops increases because of the smaller cross section of the collection vessel at lower levels. Finally when the fluid is near the neck at the bottom of the vessel, the rate of drop can be ten times as fast as when the fluid was near the top of the vessel. It becomes especially difficult to control the valve at such times because it must be shut off quickly to prevent fat from mixing with the clear stock When there is only a small mount of stock initially available, this problem is important because all the stock resides in the lower levels of the funnel-like collection vessel and the rate of drop of the fluid in the collection vessel starts out fast and gets faster, making accurate control of the flow valve extremely difficult.

The needed improvements in separators pointed out in the above discussion of the prior art have been incorporated in the present invention, and are described m the following specifications.

SUMMARY OF THE INVENTION

An object of the present invention is to provide a conveníent means of separating oil and fat from stock, from both small and large quantities of stock.

An object of the present invention is to provide a means of deriving fat free stock in a single operation even when there is a relatively large quantity of stock available, as would be produced from cooking a large portion of meat or a complete large fowl, such as a large turkey.

An object of the present invention is to provide a means of separating and retaining large as well as small pieces of meat or foul from the stock.

An object of the present invention is to provide a separator flow valve that can be easily operated, disassembled and cleaned and for which replacement parts can be readily obtained at low cost.

The present invention comprises a colander, a transparent hopper vessel with a trap, a support base and a flow valve connected to the trap for draining fluid from the hopper vessel. The hopper vessel receives the stock. After a period of standing, the fat in the stock floats to the top and forms a clearly discernible layer. The clear stock is drained from the bottom of the hopper vessel through the trap and flow valve to an external collection vessel. As the clear stock is drawn off, the layer of fat at the top is clearly visible through the transparent walls of the hopper. The flow valve is shut off before the fat layer reaches the entrance to the flow valve in the trap, thereby preventing fat from mixing with the clear stock that has been drown off.

If only a small mount of stock is available initially, the clear stock can still be separated from the fat. The trap covers a portion of the bottom of the hopper vessel, but is still relatively large as compared to the narrow funnel necks found at the bottom of many prior art separators. For example, it occupies typically not less than 10% of the floor area of the hopper vessel. The width and breath of the trap is essentially maintained down to its bottom, providing a constant and relatively slow rate of decent of the fat layer during the period when the clear stock is being drawn off. This design thereby permits a precise cut off of the flow of stock in time to prevent mixing fat and clear stock even when only a small mount of stock is initially available.

The flow valve is designed to use a standard and readily available "O"-ring as the sealing element, which is the component most subject to ware in the valve. The "O"-ring is easily replaced at low cost, making repair of the flow valve quick and economical.

BRIEF DESCRIPTION OF THE DRAWINGS

FIG. 1 is a perspective drawing of a colander which forms the uppermost portion of the present invention.

FIG. 2A is a perspective view of a hopper vessel which forms the middle portion of the invention.

FIG. 2B is a perspective view of a trap that forms a part of the hopper vessel.

FIG. 3 is a perspective view of the base of the present invention.

FIG. 4A is a plan view of a flow valve used with the hopper vessel of the present invention.

FIG. 4B is a front view of the control lever for the flow valve.

FIG. 4C is a side view of the flow valve.

DETAILED DESCRIPTION OF THE INVENTION

As shown m FIGS. 1 through 4, the invention is comprised of four principal components, a colander 1, a hopper vessel 5, a base 12, and a flow valve 15. In particular, FIG.

1 shows the colander 1 to include four generally vertical sides walls 3A, two horizontally positioned handles 3B extending outwardly from the top portion of the front and rear side walls. A horizontally positioned strainer 2, which forms the bottom of the colander and is joined about its periphery to the inside lower edges of the side walls 3A. The lower outside edge of the side walls 3A are indented to form a recessed area 4. This recessed area is used to slide the bottom portion of the colandar into the top of the hopper vessel where the colander is held in its working position to strain the stock before it is received by the hopper vessel.

In order to facilitate the production of clear stock by requiring only one operation with the fact/stock stock separator after cooking a large portion of meat or foul such as a large turkey, the colander typically has a minimum volume of 144 cubic inches.

FIG. 2A shows the hopper vessel 5 to be comprised of four generally vertical side walls 5A joined together along their side vertical edges to form an enclosure with a generally rectangular cross section that is open at its bottom and at its top. Mounted on the outside left and right walls are handles 6A and 6B, respectively. Handle 6A is not visible, but is located on the left side wall symmetrically with respect to handle 6B on the right side wall. This Figure also shows a base 12 located immediately below the hopper vessel that is used to support the hopper vessel at a convenient working height, which is typically five inches above a working surface, such as a counter top. The base is similar in construction and cross sectional dimensions to the hopper vessel. It comprises four generally vertical walls 12A joined along their vertical edges to produce an enclosure with a generally rectangular cross section that is open at its bottom and at its top. On the top outside portion of the walls 12A is an indentation 13, which permits this portion of the base to fit inside and lock itself in its working position in the bottom of the hopper vessel. The hopper vessel includes a plurality of holes 11 in its vertical side walls below a platform 7. These holes are used for quickly draining water from the hopper vessel to facilitate the washing and clean up process. Only one hole is shown in the drawing, but these holes are generally located near the comer of the vertical walls.

FIG. 2A also shows the inside of the hopper vessel including the platform 7. FIG. 2B is a detailed drawing of this platform which is located inside and approximately midway down inside the hopper vessel. The platform is joined about its periphery to the inside walls of the hopper vessel, sealing off the inside of the hopper vessel to prevent any flow of liquid below the level of the platform. The platform includes an area 7A that slopes generally downward from its periphery at its sides and rear towards the front of the platform where a trap 8 is located. This is shown by the directional arrows 7B which point in the downward direction of the flow. The trap is typically positioned in the front, central area of the platform. The trap is in the form of a generally cubic shaped depression that is open at its top, with its top edges joined to the platform and with its forward side edges joined to the inside front wall of the hopper vessel.

As can be seen in FIG. 2A, them is a threaded port 9, referred to as the drain pipe port, which passes through the front wall of the hopper vessel and enters into the lower portion of the trap. Through this port is threaded a dram pipe D that is a part of the flow valve 15 which is shown in detail in FIGS. 4A, 4B and 4C. In particular, it can be seen from the plan view of this flow valve, shown in FIG. 4A, that the flow valve comprises a control lever 16, depressible bearing shafts 17A and 17B located on opposite sides of the valve control lever, brackets 21A and 21B, each bracket having bearing ports 18A and 18B, respectively, a mounting pin 25, a spring 22, and a drain pipe 23.

On the right end of the drain pipe, as can be seen in FIG. 4A, there are external threads 23A that are threaded into port 9 to secure the valve to the hopper vessel and to make a connection to the trap to pass clear stock to an external collection vessel. The brackets 22A and 22B are positioned parallel to one another and are spaced apart to accept the placement of the control lever 16 between then; however, in FIG. 4A, the control lever is shown removed from the valve to make it possible to view components that lie below the control lever. To place the control lever between the brackets, the bearing shafts 17A and 17B, which are internally spring loaded within the control lever, are pressed inwardly towards the control lever, and the control lever is then inserted between the brackets. The control lever is positioned between the brackets in such a way as to align the bearing shafts 17A and 17B with the bearing holes 18A and 18B, respectively. Once aligned, the bearing shafts under the pressure of the internal spring loading, automatically extend outwardly from the control lever and into the bearing ports, thereby providing a pivot joint for the control lever about the bearing shafts.

The brackets are oriented vertically and are parallel to one another. They are secured in position by attachment to the drain pipe at their lower edges. The pin 25 is passes through ports 25A and 25B in the brackets 21A and 21B respectively in a direction generally orthogonal to the face of the brackets in an area near the right end of the brackets, as shown in FIG. 4A. The pin 25 spans the spacing between the brackets and is held in position by attachment means to the brackets at ports 25A and 25B.

As is known to those skilled in the art, the pin may be secured in this position by a number of methods, as for example a press fit or brazing to ports 25A and 25B in the brackets, or the pin and ports may be threaded. Similarly, the bearing shafts may be spring loaded by a number of methods, as for example placing a spring or other resilient device between the shafts within the control lever. One end of each bearing shaft is retained within the control lever by any one of several possible methods including collars about the retained end, or attachment to an internal spring, which is itself secured internally to the control lever.

In FIG. 4C, which is a side view of the flow valve, it can be seen that the valve further comprises a stopper 20 and an "O"-ring 19. The stopper typically has a circular cross section and is a part of the lower end 16C of the control lever. The lower end of the control lever shown in FIG. 4B, is flared outwardly to accommodate the size of the stopper which is typically larger than the width of the control lever. This greater width of the control lever at this point also provides mechanical support for the stopper. As shown in FIG. 4C, the stopper is positioned to be aligned with and fit into the inside of the drain pipe at its left end. When the stopper is placed inside the end of the drain pipe, it blocks the drain pipe, cutting off the flow of fluid through the pipe. The "O"-ring is fitted over the stopper. When the stopper is positioned inside the pipe, the "O"-ring is compressed between the control lever and the collection pipe, allowing it to function as a valve gasket that insures that any fluid leaking past the stopper does not pass beyond the "O"-ring.

FIG. 4C also shows that port 9 in the hopper vessel is oriented to have a slightly downward slope of approximately 15 degrees with respect to the horizontal. This slope is automatically transferred to the drain pipe when the pipe is threaded into port 9. The slope is incorporated into the design to use gravity to assist the flow of fluid from the trap through the pipe.

The side view of bracket 21B, as seen in FIG. 4C shows it to be attached at its lower edges to the top of the dram pipe 23. The top left portion of the bracket is shown to include bearing port 18B through which bearing shaft 17B extends. The control lever 16 can be seen to have an upper half 16A and a lower half 16B with the upper and lower halves joining at the middle 16C of the control lever where they form an angle of approximately 120 degrees with one another. Both the lower half and the upper half of the control lever have a longitudinal axis. The control lever also has a left and a right side These sides are parallel to one another and and are also parallel to the longitudinal axis which both lie in the same plane. The bearing shafts extend outward from their respective sides in a direction orthogonal to their respective side of the control lever.

The lower half of the control lever extends downward from the middle and is positioned generally vertically while the upper half extends to the right from its middle at an angle of approximately 30 degrees above the horizontal plane. The spring 22 is connected between the mounting pin 25 and the lower half of the control lever 16B, causing the stopper 20 to be pressed inside the collection pipe, closing the pipe and shutting off the flow of fluids through the valve until the valve is actuated. The flow valve is actuated when pressure is applied in a downward direction on the upper half of the control lever 16A. When the valve is actuated, the control lever rotates about bearing shafts 17A and 17B which are located at the middle of the control lever. This rotation, causes the stopper to be withdrawn from the collection pipe and permits fluid to flow through the valve.

The downward pitch of port 9 helps to drain fluid by gravity and thereby automatically avoids the trapping of fluids in the valve or trap. This feature alone aids in keeping the fat/stock separator clean. Also aiding in the cleaning operation is the ability of the bearing shafts to be depressed, which permits the control lever, to be removed. It is then an easy matter to clean the area normally below the control lever. The control lever contains the stopper which is easy to clean when the lever is removed from the valve. The valve gasket is a standard "O"-ring part which is simply rolled on or off the stopper, facilitate cleaning and replacement.

As is known to those skilled in the art, many variations of the present invention may be made without departing from the spirit or scope of the invention. One primary example is the hopper vessel and the trap may have round or oval walls rather than generally rectangular wall recited above in connection with the preferred embodiment The invention is limited only by the following claims.

Having described my invention I claim:

1. A fat/stock separator of the type that accepts stock containing fat and meat parts, strains the stock to separate out the meat parts, holds the stock for a period of time that is sufficient for the fat contained within the stock to float to the top of the stock, and drains off the clear stock left below the fat, said fat/stock separator comprising:

(a) a hopper vessel having a generally open top and an open bottom formed by generally vertical side walls joined together along their generally vertical adjoining edges, (b) a platform located within the hopper vessel between its top and bottom in a generally horizontal plane, said platform extending across the interior of the hopper vessels from side wall to side wall to provide, in combination with the side wails of hopper vessel, an upper hopper vessel volume sealed at its bottom by said platform and capable of holding stock, and also to provide a lower hopper vessel volume located immediately beneath said upper hopper vessel volume to support said upper hopper volume, (c) a trap, formed in an area of said platform adjacent a side wall of said hopper vessel, said trap being depressed below the bottom of said platform and said trap having a bottom and generally vertical side walls that are sealed at their juncture with one another, with the bottom of the trap, with a side wall of said hopper vessel and with said platform to enable said trap to hold stock said trap forming a pocket below the level of said platform and being connected to said platform with its top open to the upper volume of the hopper vessel to collect and drain stock from said upper volume of said hopper vessel, (d) a drain pipe port passing through a side wall of the hopper vessel to the inside of said trap at a location above and proximate the bottom of the trap, said port having a downward bias as it proceeds from the inside of the hopper vessel to the outside of the hopper vessel, (e) a drain pipe having an inside conduit, said drain pipe being connected to said hopper vessel at said drain pipe port to drain stock from said trap and said drain pipe being positioned to continue the downward bias of the drain pipe port to aid the flow of stock through said drain pipe by means of gravity flow, and (f) means for alternatively releasing and stopping the flow of stock through said drain pipe, to permit the flow of stock and stop the flow of fat and to separate the clear stock from the layer of fat.

2. A fat/stock separator as claimed in claim 1, wherein said hopper is transparent to permit an operator to see the layer of fat floating on the clear stock.

3. A fat/stock separator as claimed in claim 1, whereto the bottom of said trap is generally horizontal and includes an area that is at least ten percent of the area of said platform, the volume of said trap is at least ten percent of the upper volume of the upper hopper vessel to permit an operator to separate clean stock and fat that together only initially filled the trap.

4. A fat/stock separator as claimed in claim 1, further comprising a colander which includes:

(a) vertical side walls connected together along their generally vertical edges to provide a partially enclosed volume that is open at the top and at the bottom, (b) a strainer extending across the bottom of the side walls and being connected about its periphery to the bottom of the colanders side walls to separate meat and other solid parts contained in stock poured into the top of the colander, and (c) means for attaching the bottom of the colander to the top of the hopper vessel to drain stock through the colander into the top volume of the hopper vessel.

5. A fat/stock separator as claimed in claim 4 whereto said colander has a minimum volume of 144 cubic inches to permit all the stock and the meat derived from cooking a large portion of meat to be placed into the colander at one time.

6. A fat/stock separator as claimed in claim 1 further compressing a plurality of holes through the side walls of said hopper vessel below the platform and trap to drain water through said holes and to facilitate cleaning said hopper vessel.

7. A fat stock separator as claimed in claim 1 further comprising a base which includes generally vertical side walls joined to one another about their vertical edges to provide a partially enclosed volume open at its top and bottom, said base having a cross section at its top that is similar in configuration and dimensions to, but smaller than the bottom of said hopper vessel to fit the top of said base into the bottom of the hopper vessel to support said hopper vessel above a working surface.

8. A fat/stock separator as claimed in claim 1, further comprising a flow valve which includes:

(a) a drain pipe with an internal conduit, said drain pipe being attached at one end to the side wall of said hopper vessel containing said drain port to connect its internal conduit with said drain pipe port, (b) a first and second valve bracket formed of a general flat plate material with both brackets being generally identical in shape, said brackets having a generally linear, lower edge with said brackets being secured along said lower edge to the top of said drain pipe and said brackets being positioned parallel to one and another with a space between them, both of said brackets having a pin port and a bearing shaft port, said pin port having a centrally located axis and said bearing port having a centrally located axis, said pin and bearing port axes being separated from one and another and both of said axes being oriented generally orthogonal to the flat surface of said brackets, (c) a control lever including an upper and a lower portion, and an upper longitudinal axis generally passing through the center of the upper portion of said control lever and a lower longitudinal axis generally passing through the center of the lower portion of said control lever, said upper and lower axes of said control lever lying in a single plane and intersecting in the midsection of said control lever to form an an angle of intersection with one another, said control lever having a generally planar left and a generally planar right side, said planar left and planar right side being parallel to one another and also to said upper and lower axes, said control lever left and right sides being spaced apart from one other by a distance referred to as the control lever width, said control lever width being less than said space between said flow valve brackets to fit said control lever between said flow valve brackets, (d) a left and a right bearing shaft being depressably mounted on the left and right sides respectively of said control lever proximate the intersection of said upper and lower axes, said bearing shafts extending orthogonally outwardly of said control lever left and right sides respectively, said bearing shafts being centrally aligned on a single bearing shaft axis, said bearing shaft axis being orthogonal to said control lever right and left sides, (f) resilient means positioned between said bearing shafts within said control lever, said resilient material being compressed as said bearing shafts are depressed within said control under the application of a force and said resilient material returning to its original size forcing said bearing shafts to their original position extending outwardly of said control lever when said force is removed, (g) a pivot joint for said control lever formed of said bearing shafts and said bearing shaft ports, said bearing shafts being depressed by said force to fit said control lever between said valve brackets and said bearing shafts being released from said force when said bearing shaft are aligned with said bearing shaft ports, said bearing shafts extending through said bearing shaft ports when released from said force, and (h) a stopper end formed at one end of said control lever which is positioned to fit into the end of said drain pipe away from said hopper vessel to stop the flow of fluid through said drain pipe when said stopper end is positioned inside said dram pipe and to release the flow when said stopper end is removed from said drain pipe, said stopper end being removed from said drain pipe through actuation of said control lever by rotating said control lever about said pivot joint, and (i) a spring and means for connecting said spring between said brackets and said lower portion of said control lever below said pivot joint to hold the stopper end of said control lever within the conduit of said drain pipe to stop the flow of fluid prior to actuation of said control lever.

9. A fat/stock separator as claimed in claim 8, whereto said stopped end of said control lever and the internal conduit in said drain pipe are circular in cross section and said separator further comprising an "O"-ring which is fitted about said circular stopper end to function as a valve gasket to aid in stopping the flow of fluid through said dram pipe.

10. A fat stock separator as claimed in claim 8 further comprising a pin, said pin having a left and a right end with the left and right pin ends being positioned in the pin port of the left and right bracket respectively, and said pin serving as the means for connecting said spring to said brackets.

\* \* \* \* \*